United States Patent
Baxley et al.

(10) Patent No.: US 9,165,302 B2
(45) Date of Patent: Oct. 20, 2015

(54) SYSTEM AND METHOD FOR SCALING UP AN IMAGE OF AN ARTICLE DISPLAYED ON A SALES PROMOTION WEB PAGE

(75) Inventors: Robert H. Baxley, Los Altos, CA (US); Jeffrey Tyson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1082 days.

(21) Appl. No.: 12/240,761

(22) Filed: Sep. 29, 2008

(65) Prior Publication Data

US 2010/0083144 A1    Apr. 1, 2010

(51) Int. Cl.
  *G06F 3/048* (2013.01)
  *G06Q 30/02* (2012.01)
  *G06Q 30/06* (2012.01)
  *G06T 3/40* (2006.01)
  *H04N 21/4728* (2011.01)
  *G06F 3/0482* (2013.01)
  *H04N 21/4782* (2011.01)
  *G06F 17/30* (2006.01)

(52) U.S. Cl.
  CPC .......... *G06Q 30/02* (2013.01); *G06F 3/0482* (2013.01); *G06Q 30/0643* (2013.01); *G06T 3/40* (2013.01); *H04N 21/4728* (2013.01); *G06F 17/30274* (2013.01); *G06F 17/30899* (2013.01); *H04N 21/4782* (2013.01)

(58) Field of Classification Search
  CPC ............. G06F 17/30899; G06F 2203/04806; G06F 17/30274; G06F 3/0482; H04N 21/4872; H04N 21/4728; G06T 3/40; G06Q 30/0643
  USPC ......................................... 715/815, 838, 962
  See application file for complete search history.

(56) References Cited

U.S. PATENT DOCUMENTS

| | | | |
|---|---|---|---|
| 5,461,560 A * | 10/1995 | Uribe | 700/83 |
| 7,856,380 B1 * | 12/2010 | Latin-Stoermer et al. | 705/27.1 |
| 8,078,603 B1 * | 12/2011 | Chandratillake et al. | 707/706 |
| 8,700,490 B1 * | 4/2014 | Bhaktwatsalam et al. | 705/27.1 |
| 2002/0080276 A1 * | 6/2002 | Mori et al. | 348/553 |
| 2002/0082952 A1 * | 6/2002 | Johnston | 705/27 |
| 2003/0023514 A1 * | 1/2003 | Adler et al. | 705/27 |
| 2003/0076435 A1 * | 4/2003 | Sato | 348/333.11 |
| 2003/0164861 A1 * | 9/2003 | Barbanson et al. | 345/815 |
| 2003/0210281 A1 * | 11/2003 | Ellis et al. | 345/838 |
| 2004/0194014 A1 * | 9/2004 | Anwar | 715/500 |
| 2005/0041146 A1 * | 2/2005 | Lee et al. | 348/468 |
| 2005/0138570 A1 * | 6/2005 | Good et al. | 715/789 |
| 2005/0195157 A1 * | 9/2005 | Kramer et al. | 345/156 |
| 2005/0235222 A1 * | 10/2005 | Barbanson et al. | 715/791 |
| 2005/0273727 A1 * | 12/2005 | Barbanson et al. | 715/791 |
| 2005/0283371 A1 * | 12/2005 | Tiramani | 705/1 |
| 2006/0098111 A1 * | 5/2006 | Goh et al. | 348/333.05 |
| 2006/0103891 A1 * | 5/2006 | Atkins | 358/450 |
| 2007/0110338 A1 * | 5/2007 | Snavely et al. | 382/305 |
| 2007/0165103 A1 * | 7/2007 | Arima et al. | 348/14.01 |
| 2007/0182999 A1 * | 8/2007 | Anthony et al. | 358/452 |
| 2007/0192739 A1 * | 8/2007 | Hunleth et al. | 715/823 |
| 2007/0237032 A1 * | 10/2007 | Rhee et al. | 368/10 |
| 2008/0012863 A1 * | 1/2008 | Finn et al. | 345/473 |

(Continued)

*Primary Examiner* — Patrick Riegler
(74) *Attorney, Agent, or Firm* — Novak Druce Connolly Bove + Quigg LLP

(57) ABSTRACT

Method and arrangement for scale-up of an image of an article displayed on a sales promotion web page is disclosed. The method includes displaying an image of an article on a sales promotion web page in a first scale. The method then includes, based on cursor-selection of the displayed image, enlarging the scale of the image to a second larger scale on the same web page.

13 Claims, 6 Drawing Sheets

(56) References Cited

U.S. PATENT DOCUMENTS

| | | |
|---|---|---|
| 2008/0092040 A1* | 4/2008 | Nakamura .................... 715/273 |
| 2008/0117232 A1* | 5/2008 | Edmark ........................ 345/630 |
| 2008/0225153 A1* | 9/2008 | Fagans ..................... 348/333.01 |
| 2008/0250332 A1* | 10/2008 | Farrell et al. .................. 715/753 |
| 2008/0282196 A1* | 11/2008 | Park ............................. 715/838 |
| 2009/0019369 A1* | 1/2009 | Borovsky et al. ............. 715/736 |
| 2009/0109243 A1* | 4/2009 | Kraft et al. .................... 345/660 |
| 2009/0132952 A1* | 5/2009 | Wong ............................ 715/781 |
| 2009/0177538 A1* | 7/2009 | Brewer et al. .................... 705/14 |
| 2009/0259935 A1* | 10/2009 | Kramer et al. ................ 715/234 |
| 2009/0265255 A1* | 10/2009 | Jackson et al. .................. 705/27 |
| 2010/0036753 A1* | 2/2010 | Harvill et al. ................... 705/27 |
| 2010/0045987 A1* | 2/2010 | Bonikowski et al. ......... 356/402 |
| 2010/0164992 A1* | 7/2010 | Akiya .......................... 345/641 |

\* cited by examiner

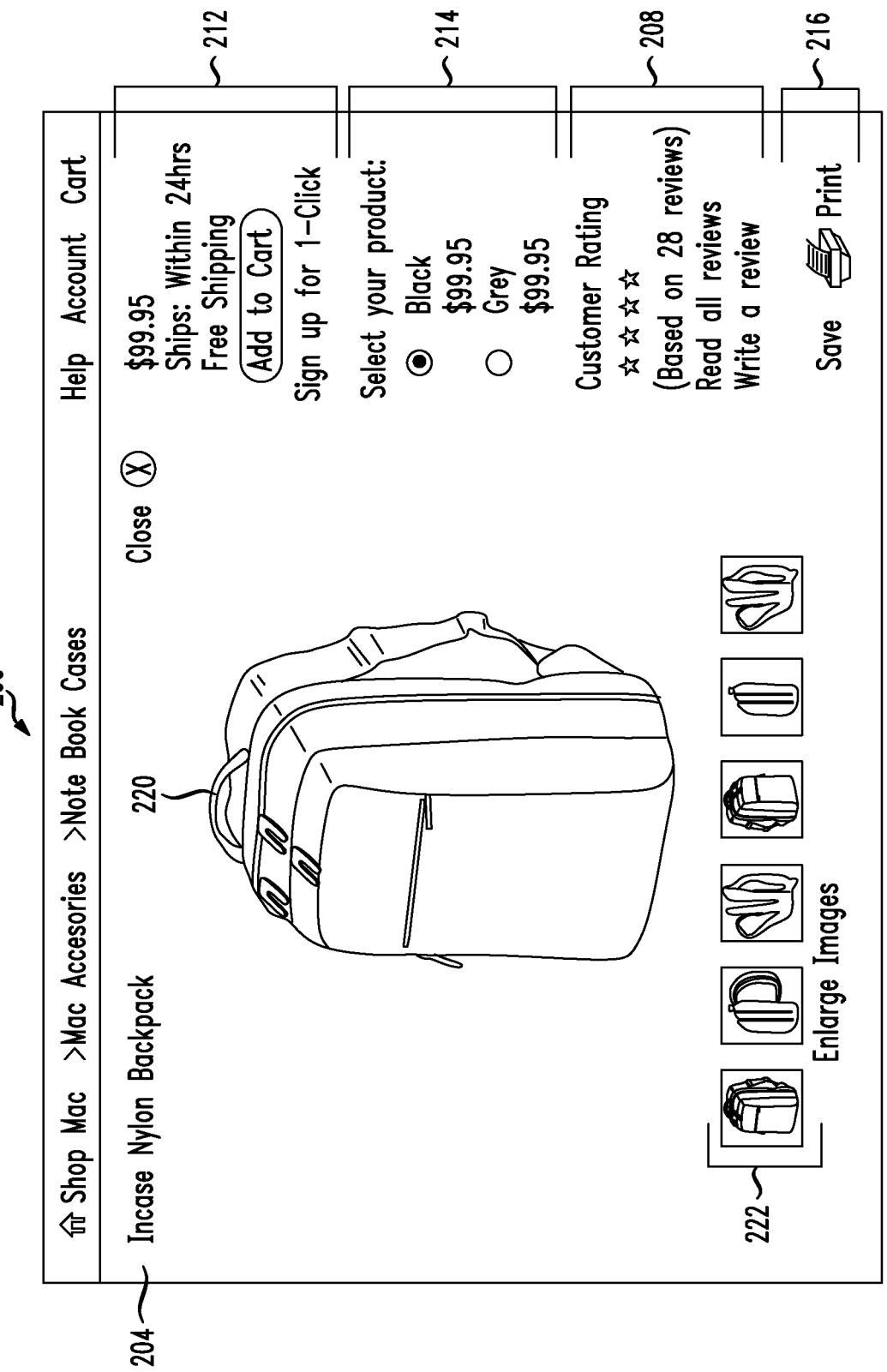

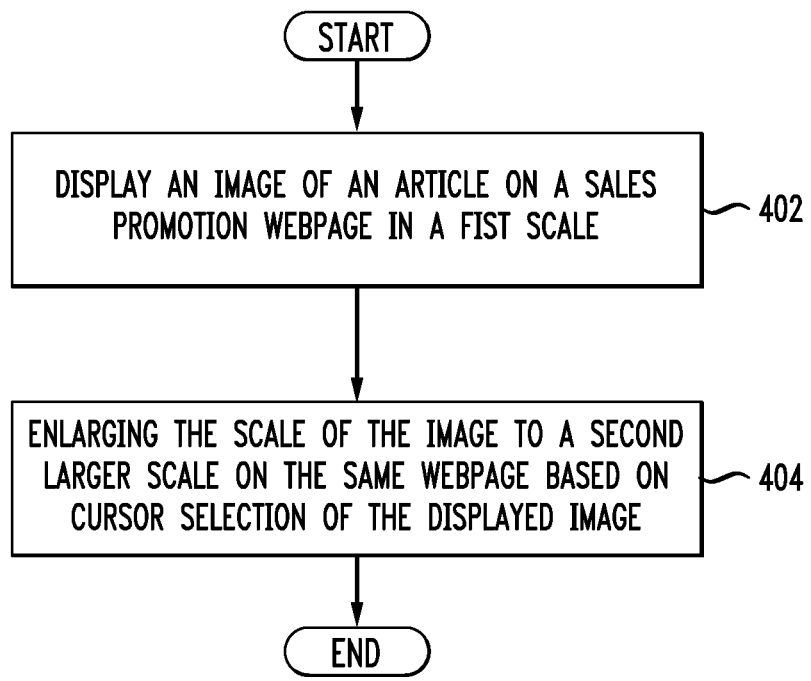

SYSTEM AND METHOD FOR SCALING UP AN IMAGE OF AN ARTICLE DISPLAYED ON A SALES PROMOTION WEB PAGE

BACKGROUND

1. Field

The present disclosure relates to displaying images of articles for sale on a web page, and more particularly to scaling up an image of an article displayed on a sales promotion web page.

2. Introduction

With the development of the Internet, on-line stores have become very popular. These stores allow consumers with Internet access to browse and purchase articles for sale. Consumers typically access these stores through the World Wide Web via web pages viewed through a web browser. Examples of articles that can be purchased on-line include clothes, books, electronic devices, toys, games, downloadable media, travel reservations, and furniture. This is not an exhaustive list. Virtually any article that can be purchased in a traditional store can be bought from an on-line store. After the transaction is complete, the online store ships the purchased item if it is a tangible item. Alternatively, if the purchased article is digital media, the store can transfer the purchased digital content to the customer upon payment via download. Purchased digital content can be downloaded and played on personal computers, portable media players, smart phones, cell phones, televisions, television media players, video game devices and other electronic devices. On-line stores are popular with consumers because they can conveniently shop for a very large variety of articles whenever they are connected to the Internet. Generally, consumers desire an on-line store with a large selection of articles for sale with competitive prices. On-line store designers may benefit from showing a potential customer a large variety of products with smaller images, and then scale-up images of articles in which the customer indicates a particular interest in. An online store can alter the format of the web page to further tailor an article's presentation once a potential customer has indicated an interest in the item.

Traditionally, online stores have provided an enlarged or more detailed view of an item by loading a different web page containing the more detailed image. Unfortunately, downloading a different web page often involves complexities such as the need for the user to manage multiple web pages, a browsing history, pop-ups, or other mechanisms, i.e. the original web page with the smaller image and the different web page with the enlarged image. Moreover, downloading a new web page ordinarily involves a momentary delay that is noticeable to the user during which the new page flashes into view. In some parts of the world where access to the Internet is metered and not unlimited, these extra page refreshes can add up to a significant expense.

Therefore, what is needed is a system and method for scale-up of an image of an article displayed on a sales promotion web page that enlarges the image within the same web page and provides an enhanced user experience.

SUMMARY

Additional features and advantages of the disclosure will be set forth in the description which follows, and in part will be obvious from the description, or may be learned by practice of the contained teachings. The features and advantages of the disclosure may be realized and obtained by means of the instruments and combinations particularly pointed out in the associated claims. These and other features of the disclosure will become more fully apparent from the following description and associated claims, or may be learned by the practice of the teachings set forth herein.

This disclosure describes a system and method for scaling up an image of an article displayed on a sales promotion web page. Disclosed are systems, methods and computer readable media for accomplishing this scaling up an image of an article displayed on a sales promotion web page. Sales promotion web pages include any commerce related website.

The method embodiment is illustrative of principles of the present disclosure and those same principles are also applicable to the system and computer readable medium embodiments. A method of scaling up an image of an article displayed on a sales promotion web page is disclosed. The method includes displaying an image of an article on a sales promotion web page in a first scale. Then, based on cursor-selection of the displayed image, the method includes enlarging the scale of the image to a second larger scale on the same web page.

The present disclosure may apply to any image on a sales promotion web page. These images can be, for example, in a JPG, BMP, TIFF, GIF, or PNG format, among others.

BRIEF DESCRIPTION OF THE DRAWINGS

In order to better describe the manner in which the advantages and features of the disclosure can be obtained, a more detailed description follows with reference to specific embodiments that are illustrated in the accompanying drawings in which:

FIG. 2B illustrates an example system embodiment of a scaled-up of an image of an article displayed on a sales promotion web page;

FIG. 4 illustrates an example method embodiment for scale-up of an image of an article displayed on a sales promotion web page.

DETAILED DESCRIPTION

Various embodiments configured according to the present disclosure are discussed in detail below. While specific implementations are discussed, it should be understood that this is done for illustration purposes only. A person skilled in the relevant art will recognize that other components and configurations may be used without parting from the spirit and scope of the description.

Figure 1:
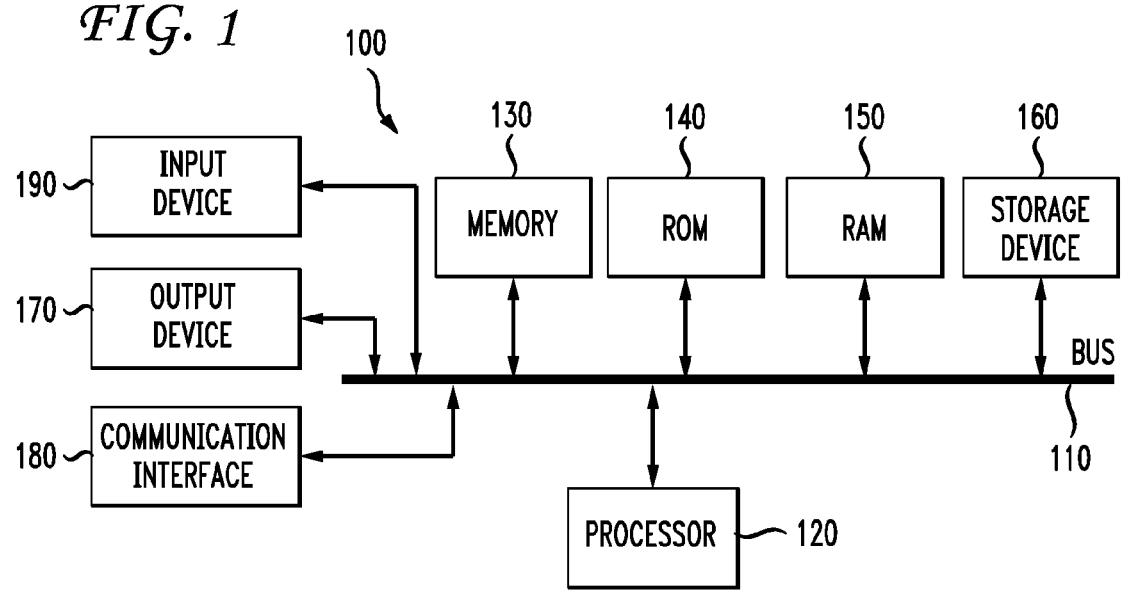
FIG. 1 illustrates an example system embodiment.

With reference to FIG. 1, an exemplary system comprises (includes) a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that certain presently described embodiments can operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etcetera. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction in the disclosure limiting operation to being on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Having disclosed the fundamental elements of an example system embodiment which can be configured to practice the principles described herein, the disclosure turns to various examples which are discussed in the context of the system embodiment. As noted above, the subject matter of the present disclosure enables the scale-up of an image of an article displayed on web page. Any on-line store that presents an image of an article for sale is contemplated as within the scope of this disclosure. Other web pages which display images and thumbnails are also within the scope of this disclosure.

Figure 2A:
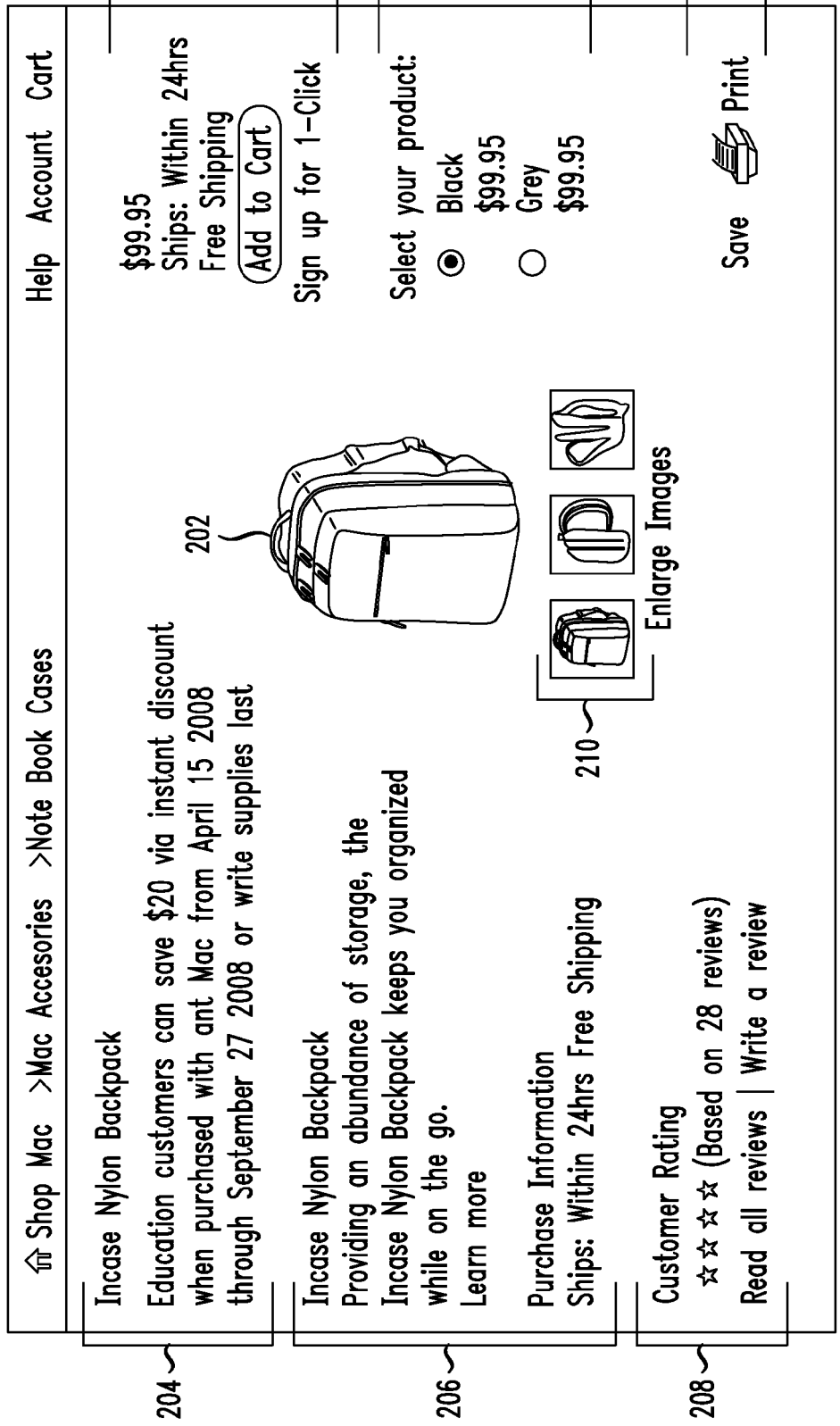
FIG. 2A illustrates an article for sale on a web page.

FIG. 2A illustrates an article for sale on a web page. The web page 200 displays an article for sale, which in this case is a nylon backpack. The web page displays a main image 202 for the article. The web page also includes thumbnail images 210 of various views of the article so that a user can examine the article. When the user selects a thumbnail image 210 based on cursor location or similar selection, the system exchanges the thumbnail image with the displayed image in a smooth, animated manner. The exchange can be exact, where the image and the thumbnail swap exact positions. The exchange can be approximate. For example, the image can return to its previous position in the set of thumbnails and the thumbnail can move to the main image's previous location, leaving a gap in the set of thumbnails. The transition is a smooth, fluid movement of both the image and the thumbnail. The image is shrunk down to a thumbnail scale and size, while the thumbnail is expanded to a larger scale and size.

The web page includes a main name or title of the article 204. The web page further displays customer rating metadata 208. This customer rating metadata 208 indicates the average rating for users that have written a view, as well as a link to read the reviews or write a new review. On the right side of web page 200, the system displays price and shipping cost 212 and a link to add the item to a virtual cart, as well as an option to sign up for 1-click. 1-click is an option wherein a user can purchase items with a single click of the mouse. Additionally, the right side of web page 200 includes an option to select one of two colors 214 for the displayed item.

The right side of the web page 200 includes save and print options 216. These allow a user to print and save the displayed information on the article for sale for later viewing.

FIG. 2B illustrates a scaled up image of the article for sale in FIG. 2A. The system presents a scaled up image of the article for sale based on a cursor selection in one embodiment. Cursor selection can occur when a user moves a cursor over the displayed image. However, a user can trigger a cursor selection with the system based on a certain number of clicks on the displayed image. For example, an online store can designate a single click to display the image and a double click on the displayed image to act as a cursor selection and trigger the transformation to the scaled-up image of the article.

As will be appreciated by those persons skilled in these arts, other types of cursor activity, such as mouse gestures, can also define a cursor selection. The web page 200 displays the same article for sale as FIG. 2A, which in this case is a nylon backpack. The web page displays an enlarged main image 220 for the article. The system enlarges the main image 220 to a second, larger scale on the same web page 200. During the scaling-up from the first image 202 to the second image 220, the system shifts the image to a second location on the same web page 200 while simultaneously scaling-up from the first scale image 202 to the second larger scale image 220. In this embodiment the enlarged scale main image 220 is enlarged by continuously and smoothly expanding the scale of the image from the first to the second larger scale. Such a continuous and smooth expansion can provide an animation-like effect.

The web page 200 also includes thumbnail images 222 where a user can select other images of the article. The thumbnail images 222 differ in quantity and location from those depicted in FIG. 2A. The web page 200 includes a main name of the article 204 in roughly the same position as compared to FIG. 2A. The web page 200 further displays customer rating metadata 208. In this embodiment, the system moves the customer rating metadata 208 from a bottom left corner of web page 200 to the bottom right corner of web page 200 to allow for the enlarged main image 220. The customer rating metadata 208 options are unchanged from FIG. 2A and indicate the average rating for users that have written a view, as well as a link to read the reviews or write a new review.

On the right side of web page 200, the system displays the price, shipping cost, and a link to add the item to a virtual cart 212, as well as an option to sign up for 1-click. Additionally, the right side of web page 200 includes an option to select one of two colors 214 for the displayed item. Also, the right side of the web page 200 includes save and print options 216. The system does not change the location of the price and shipping area information 212, the option to select one of two color 214 for the displayed item, and save and print options 216 from their respective positions in FIG. 2A and FIG. 2B. These options, as well as any other information presented along with an article for sale, may be relocated on a web page, redacted, edited, or removed to accommodate the enlargement of the main image. In one embodiment, the system animates the web page elements which change to accommodate the enlarged image so they move smoothly from their original position and size to their new position and size in the same manner as the image and the thumbnail.

Figure 3A:
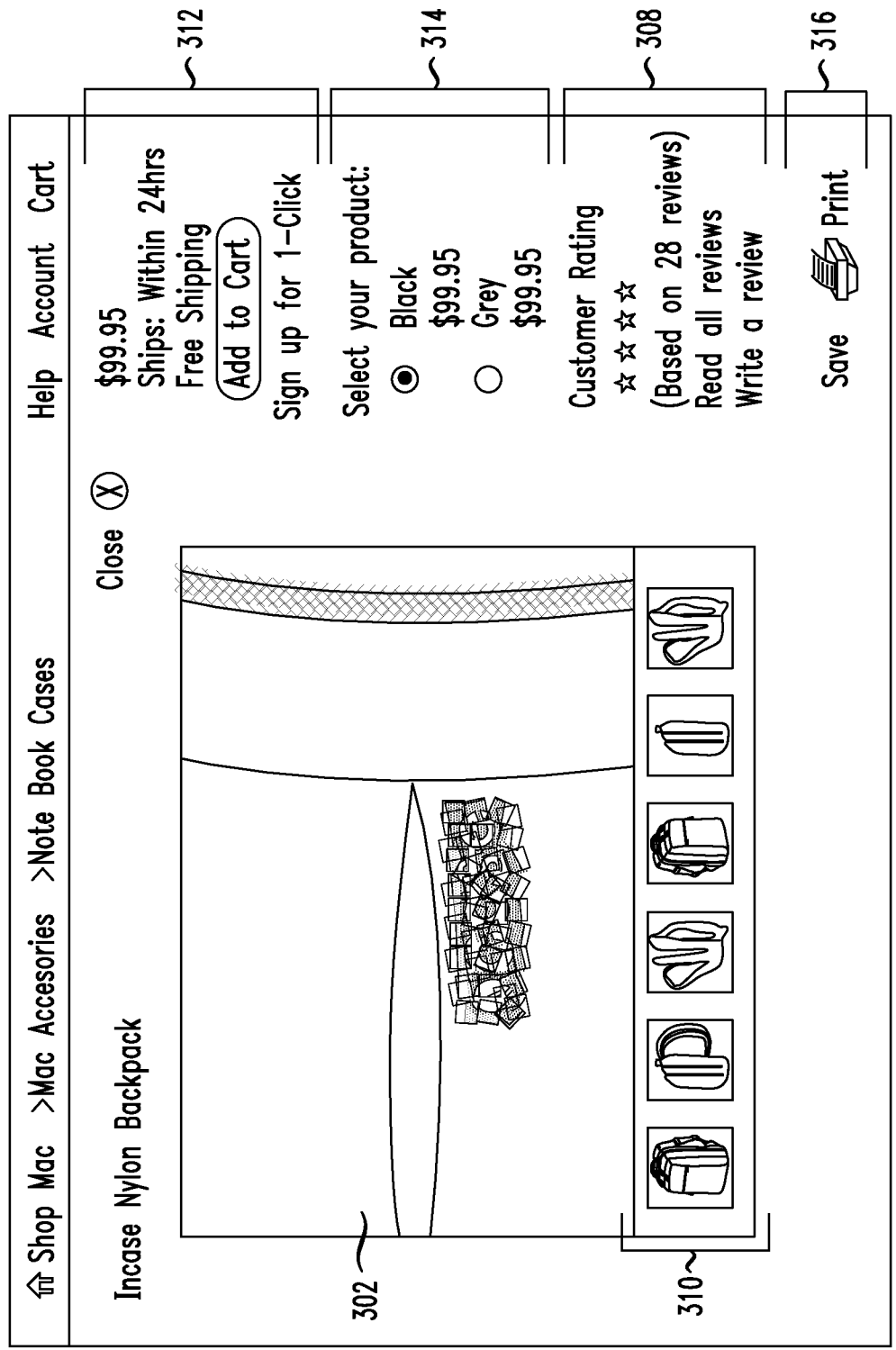
FIG. 3A illustrates an example of how to enlarge the scale of a portion of the second larger scale image to a third even larger scale image based on cursor designation of the portion by continuously expanding the scale of the portion of the image from the second larger scale to the third even larger scale.

FIG. 3A illustrates enlarging the scale of a portion of the second larger scale image to a third even larger scale image based on cursor designation of the portion. The system can enlarge the image by continuously expanding the scale of the portion of the image from the second larger scale to the third even larger scale. As shown in FIG. 3A the web page 300 displays a third larger scale image 302 based on cursor designation of the portion. In one example, the user selects the portion of the backpack image showing the name tag of the backpack by single clicking a mouse near the name tag of the backpack on the image. However, as described above, the cursor designation can be defined as any input from any human interface device from the user to affect the cursor, such as single-clicking, double-clicking, or gesturing on a desired designated area on a displayed article image. Also, the system can define right button mouse or trackball clicks to act as a cursor designation.

The system can display all of the scale-ups of an image of an article on a web page within the same page without refreshing or navigating elsewhere. A system, such as a web server, can use Asynchronous Javascript and XML (AJAX) to provide such an effect. It is also contemplated that other technologies, languages, and web platforms can be used.

The web page 300 further displays customer rating metadata 308. On the right side of web page 300 a price and shipping area 312 displays price, shipping cost, and a link to add the item to a virtual cart, as well as an option to sign up for 1-click. Additionally, the right side of web page 300 includes an option to select one of two colors 314 for the displayed item. Also, the right side of the web page 300 includes save and print options 316.

Figure 3B:
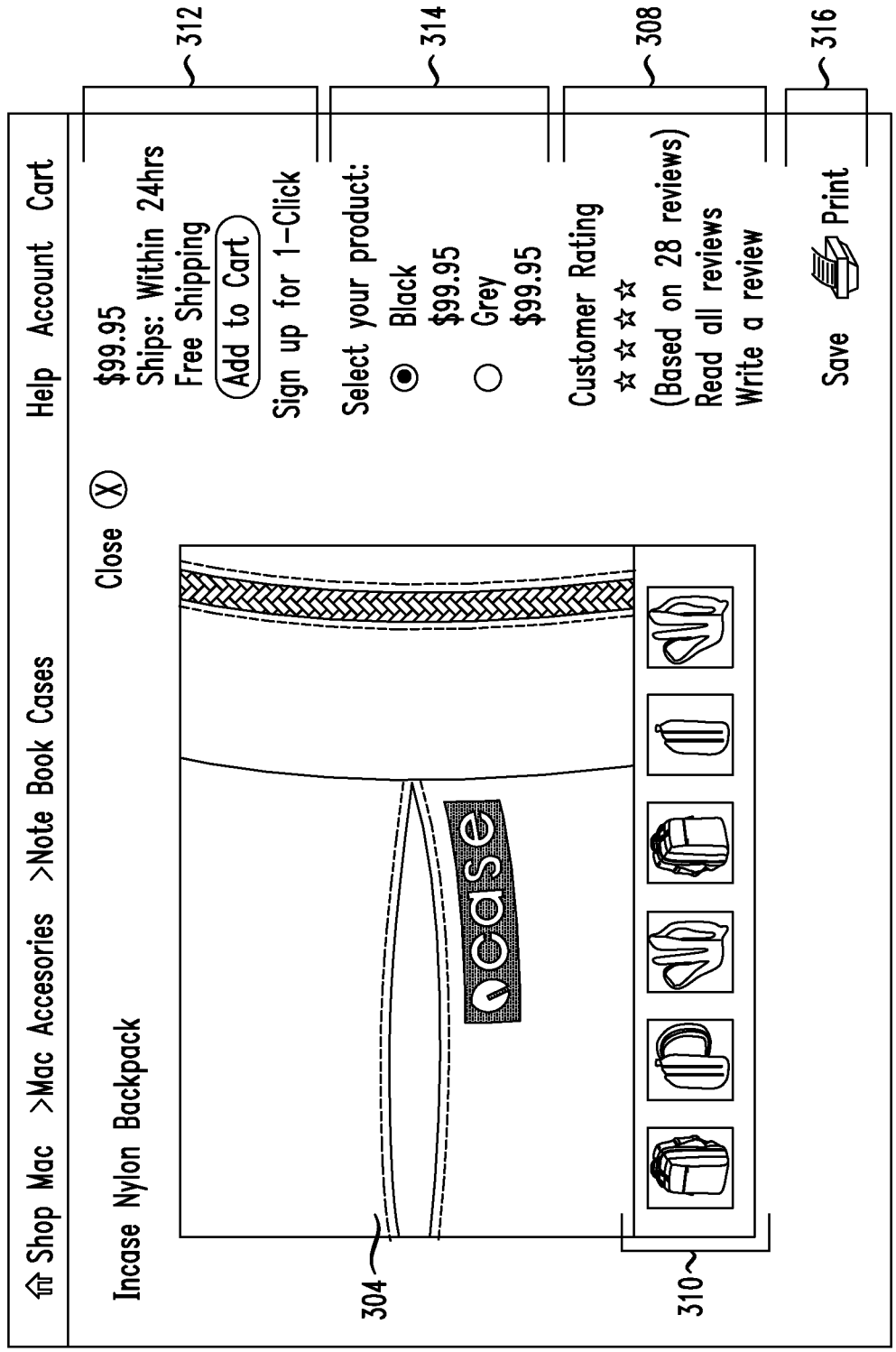
FIG. 3B illustrates an example of how to replace the third even larger scale image portion with a higher resolution image of the same image portion.

FIG. 3B illustrates a higher resolution replacement image 304 that replaces the third even larger scale image portion 302. On the right side of web page 300 a price and shipping area 312 displays price, shipping cost, and a link to add the item to a virtual cart, as well as an option to sign up for 1-click. Additionally, the right side of web page 300 includes an option to select one of two colors 314 for the displayed item. The right side of the web page 300 includes save and print options 316. The location of price and shipping area information 312, an option to select one of two color 314 for the displayed item, and save and print options 316 remain in the same relative positions in FIG. 3A and FIG. 3B. However, these options, as well as any other information presented along with an article for sale may be relocated, edited, redacted, or removed upon the replacement of the third larger scale image 302 with the higher resolution image 304.

FIG. 4 illustrates an example method embodiment for scaling up an image of an article displayed on a sales promotion web page. The method embodiment is discussed in terms of a system configured to practice the method. Such a system can be a single web server, a cluster of web servers, a personal computer, a PDA, smartphone, etcetera. The system displays an image of an article on a web page in a first scale (402). The system enlarges the image to a second larger scale on the same web page based on a selection of the displayed image by smoothly expanding the image from the first scale to the second larger scale (404). In one embodiment, the system shifts the image to a second location on the same web page while simultaneously enlarging the image.

In another embodiment, the system enlarges a portion of the second larger scale image to a third even larger scale image based on a designation of the portion by smoothly expanding the portion of the image from the second larger scale to the third even larger scale. In one variation on this embodiment, the system replaces the third even larger scale image portion with a corresponding higher resolution image. A user who desires to see fine details of an article may find this variation useful. For example, with articles of clothing, a high-level picture of the entire blouse is insufficient to convey the subtle colors and textures which are more apparent when viewed from a shorter distance. With articles of this sort, users appreciate and benefit from enlarged, higher resolution images.

In one embodiment involving thumbnails, the system displays alternative thumbnail images of the article on the same web page, receives a designation of a selected thumbnail image, and exchanges the selected thumbnail with the enlarged image by simultaneously smoothly enlarging the thumbnail, smoothly reducing the enlarged image, and smoothly transitioning the image and the thumbnail to each other's respective location. This effect provides immediate feedback to a user so that the user knows where an image comes from and where an image goes. Users can track each image and thumbnail visually through the smoothly animated motion and scaling. In one variation, the system remembers the scale of the enlarged image and applies it to an exchanged thumbnail. For example, if image A is zoomed into a higher resolution view, and thumbnail B is selected to replace it, the system swaps the image A and thumbnail B. The system further enlarges thumbnail B to the same level of detail and resolution at which image A had been before. In a second variation, if image A is zoomed into a higher resolution view, and thumbnail B is selected to replace it, the system swaps the image A and thumbnail B. However, in this second variation the system enlarges thumbnail B to a default level of detail and resolution. Then upon a user selection of a portion of image B the system enlarges image B to the same level of detail and resolution at which image A had been before.

In order to accommodate a larger scale image, the system can remove, relocate, or reformat web page elements such as the title, price, reviews, overview, etcetera shown in FIGS. 2A, 2B, 3A, and 3B. The system can further overlay semi-transparent information, such as web page elements, over the second larger scale image, at least partially. The system can overlay the information in order to allow a larger image. In some instances, a larger, partially obscured image is desirable over a smaller, unobscured image.

Embodiments within the scope of the present disclosure may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above are also included within the scope of the described computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etcetera that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments configured according to these teachings may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, it should not be construed as limiting to the claims in any way. Other configurations of the described embodiments also fit within the scope of what is claimed. For example, the principles described herein can be applied to non-commercial, non-advertising images, such as an online photo album. Accordingly, the claims and their legal equivalents are what define the patent coverage contained herein, rather than any specific examples given.

We claim:

1. A method comprising:
    displaying a first image and a second image on a web page hosted on a web server, wherein the first image is displayed in a first scale and the second image is displayed in a second scale that is smaller than the first scale;
    receiving a selection of the second image;
    based on the selection, moving the second image to a first location associated with the first image and moving the first image to a second location corresponding to a previous location of the second image on the web page, wherein the second image is enlarged to the first scale as the second image is moved to the first location, the enlarging being performed in a continuous and animated manner, without refreshing the web page;
    while the second image is located at the first location, detecting that an indicator is positioned at a first point over the second image, wherein movement of the indicator is controlled by a user;
    in response to detecting that the indicator is positioned at the first point, enlarging a portion of the second image corresponding to the first point, wherein the portion of the second image that is enlarged is presented in a third scale that is larger than the first scale; and
    after enlarging the portion of the second image, relocating web page elements to accommodate the portion of the second image, wherein relocating the web page elements comprises animating the web page elements to smoothly move from an original position and size to a new position and new size.

2. The method of claim 1, wherein enlarging the portion of the second image is performed by smoothly expanding the portion of the second image to the third scale.

3. The method of claim 2, wherein the portion of the second image that is enlarged is presented at a first resolution level and a second portion of the second image that is not enlarged is presented at a second resolution level, the first resolution level being higher than the second resolution level.

4. The method of claim 1, further comprising:
displaying alternative thumbnail images on the web page, wherein the second image comprises one of the alternative thumbnail images;
receiving a designation of a selected thumbnail image, the selected thumbnail image being the second image;
exchanging the selected thumbnail image with the first image by smoothly enlarging the selected thumbnail image, smoothly reducing the first image in size, and smoothly transitioning the first image and the selected thumbnail image to each other's respective location; and
presenting an animated movement of information associated with at least one of the selected thumbnail image and the first image.

5. The method of claim 1, further comprising removing the web page elements to accommodate the second image.

6. The method of claim 1, further comprising converting the web page elements to semi-transparent form and at least partially overlaying the web page elements in semi-transparent on the first image.

7. A system comprising:
a computer processor; and
a memory containing instructions that, when executed, cause the computer processor to:
display a first image and a second image on a web page hosted on a web server, wherein the first image is displayed in a first scale and the second image is displayed in a second scale that is smaller than the first scale;
receive a selection of the second image;
based on the selection, move the second image to a first location associated with the first image and moving the first image to a second location corresponding to a previous location of the second image on the web page, wherein the second image is enlarged to the first scale as the second image is moved to the first location, the enlarging being performed in a continuous and animated manner, without refreshing the web page;
while the second image is located at the first location, detect that an indicator is positioned at a first point over the second image, wherein movement of the indicator is controlled by a user;
in response to detecting that the indicator is positioned at the first point, enlarge a portion of the second image corresponding to the first point, wherein the portion of the second image that is enlarged is presented in a third scale that is larger than the first scale, and
after enlarging the portion of the second image, relocate web page elements to accommodate the portion of the second image, wherein relocating the web page elements comprises animating the web page elements to smoothly move from an original position and size to a new position and new size.

8. The system of claim 7, wherein enlarging the portion of the second image is performed by smoothly expanding the portion of the second image to the third scale.

9. The system of claim 8, wherein the portion of the second image that is enlarged is presented at a first resolution level and a second portion of the second image that is not enlarged is presented at a second resolution level, the first resolution level being higher than the second resolution level.

10. The system of claim 7, wherein the instructions further cause the computer processor to:
display alternative thumbnail images on the web page, wherein the second image comprises one of the alternative thumbnail images;
receiving a designation of a selected thumbnail image, the selected thumbnail image being the second image;
exchange the selected thumbnail image with the first image by smoothly enlarging the selected thumbnail image, smoothly reducing the first image in size, and smoothly transitioning the first image and the selected thumbnail image to each other's respective location; and
present an animated movement of information associated with at least one of the selected thumbnail image and the first image.

11. The system of claim 7, wherein the instructions further cause the computer processor to:
remove the web page elements to accommodate the second image.

12. The system of claim 7, wherein the instructions further cause the computer processor to:
convert the web page elements to semi-transparent form and at least partially overlaying the web page elements in semi-transparent on the first image.

13. A non-transitory computer-readable medium storing instructions that, when executed by a computer processor, cause the computer processor to:
display a first image and a second image on a web page hosted on a web server, wherein the first image is displayed in a first scale and the second image is displayed in a second scale that is smaller than the first scale;
receive a selection of the second image;
based on the selection, move the second image to a first location associated with the first image and moving the first image to a second location corresponding to a previous location of the second image on the web page, wherein the second image is enlarged to the first scale as the second image is moved to the first location, the enlarging being performed in a continuous and animated manner, without refreshing the web page;
while the second image is located at the first location, detect that an indicator is positioned at a first point over the second image, wherein movement of the indicator is controlled by a user;
in response to detecting that the indicator is positioned at the first point, enlarge a portion of the second image corresponding to the first point, wherein the portion of the second image that is enlarged is presented a third scale that is larger than the first scale, and
after enlarging the portion of the second image, relocate web page elements to accommodate the portion of the second image, wherein relocating the web page elements comprises animating the web page elements to smoothly move from an original position and size to a new position and new size.

* * * * *